US011822709B2

(12) United States Patent
Liu et al.

(10) Patent No.: US 11,822,709 B2
(45) Date of Patent: Nov. 21, 2023

(54) SYSTEMS, DEVICES AND METHODS USING SPECTACLE LENS AND FRAME

(71) Applicant: ESSILOR INTERNATIONAL, Charenton-le-Pont (FR)

(72) Inventors: Yu Liu, Singapore (SG); Chit Yaw Fu, Singapore (SG); Yassine Fakhreddine, Singapore (SG); Xingzhao Ding, Singapore (SG)

(73) Assignee: Essilor International, Charenton-le-pont (FR)

( * ) Notice: Subject to any disclaimer, the term of this patent is extended or adjusted under 35 U.S.C. 154(b) by 50 days.

(21) Appl. No.: 17/632,623

(22) PCT Filed: Aug. 5, 2020

(86) PCT No.: PCT/EP2020/072012
§ 371 (c)(1),
(2) Date: Feb. 3, 2022

(87) PCT Pub. No.: WO2021/023775
PCT Pub. Date: Feb. 11, 2021

(65) Prior Publication Data
US 2022/0291740 A1  Sep. 15, 2022

(30) Foreign Application Priority Data
Aug. 8, 2019  (EP) .................................... 19315087

(51) Int. Cl.
*G06F 3/01* (2006.01)
*G02B 27/01* (2006.01)
(Continued)

(52) U.S. Cl.
CPC .......... *G06F 3/011* (2013.01); *G02B 27/0172* (2013.01); *G02C 7/021* (2013.01); *G02B 2027/0178* (2013.01)

(58) Field of Classification Search
USPC ........................................................ 345/156
See application file for complete search history.

(56) References Cited

U.S. PATENT DOCUMENTS

2008/0143954 A1*  6/2008  Abreu .................... G06F 3/167
351/158
2010/0083188 A1   4/2010  Pance
(Continued)

FOREIGN PATENT DOCUMENTS

| EP | 3 267 239    | 1/2018 |
|----|--------------|--------|
| EP | 3 293 566    | 3/2018 |
| WO | 2019/025146  | 2/2019 |

OTHER PUBLICATIONS

International Search Report for PCT/EP2020/072012, dated Oct. 8, 2020, 4 pages.

(Continued)

*Primary Examiner* — Chineyere D Wills-Burns
(74) *Attorney, Agent, or Firm* — NIXON & VANDERHYE

(57) ABSTRACT

A system including a sensor configured so that the presence of a spectacle within a detection range of the sensor is detectable by the sensor when the spectacle includes a predetermined identification structure. The system may further include a control unit configured to receive an information from the sensor and to carry out a predetermined (Continued)

action, upon a condition in which the one or more spectacle lenses may be detected. A method may include detecting the presence of the spectacle within a detection range, and further providing, by the sensor, an information to the control unit. The information may confirm the detection of the spectacle. The method may include carrying out, by the control unit, the predetermined action. A computer program product including instructions to cause the system to execute the steps of the method. A computing device including the sensor and a memory.

14 Claims, 5 Drawing Sheets

(51) Int. Cl.
*G06F 1/3231* (2019.01)
*G02C 7/02* (2006.01)
*G06F 1/3234* (2019.01)
*G06K 19/06* (2006.01)
*G02C 11/00* (2006.01)

(56) References Cited

U.S. PATENT DOCUMENTS

| | | | | |
|---|---|---|---|---|
| 2010/0103516 | A1* | 4/2010 | McKnight | H04N 13/373 359/464 |
| 2011/0316847 | A1* | 12/2011 | Cheng | G06F 1/325 359/464 |
| 2013/0235331 | A1* | 9/2013 | Heinrich | G02C 11/10 351/158 |
| 2014/0225915 | A1* | 8/2014 | Theimer | G02B 27/0093 345/633 |
| 2015/0003819 | A1* | 1/2015 | Ackerman | G03B 13/36 396/51 |
| 2016/0131902 | A1* | 5/2016 | Ambrus | G06F 3/013 345/156 |
| 2016/0300109 | A1* | 10/2016 | Aonuma | G06F 3/147 |
| 2017/0031435 | A1* | 2/2017 | Raffle | G02B 27/017 |
| 2019/0041666 | A1* | 2/2019 | Abele | G02B 27/00 |

OTHER PUBLICATIONS

Written Opinion of the ISA for PCT/EP2020/072012, dated Oct. 8, 2020, 7 pages.

* cited by examiner

SYSTEMS, DEVICES AND METHODS USING SPECTACLE LENS AND FRAME

This application is the U.S. national phase of International Application No. PCT/EP2020/072012 filed Aug. 5, 2020 which designated the U.S. and claims priority to EP Patent Application No. 19315087.7 filed Aug. 8, 2019, the entire contents of each of which are hereby incorporated by reference.

FIELD

This disclosure relates to a system, a method of operating the system, a computer program, and a device using a spectacle.

BACKGROUND

It is estimated that about 60% of the world wide population uses spectacles for some sort of vision correction. This number is much higher if spectacles which do not primarily have a correction function are also considered, for example, safety spectacles, sunglasses, and swimming goggles. Most spectacles have some sort of frame to hold a pair of lenses in place, so that when the frame is rested on facial features (e.g. nose and ears), the lenses are placed in front to the eyes.

Most types of known spectacles adjust the light and/or image to be received by an observer wearing the spectacles, and may further have aesthetical and ergonomic features.

SUMMARY

The present disclosure relates to a system, a method of operating the system, a computer program, and a device using a spectacle for a one-way or two-way interaction, thus providing additional benefits to a user wearing the spectacle.

A first aspect of the disclosure concerns a system including a sensor. The sensor may be configured so that the presence of one or more spectacle lenses within a detection range of the sensor is detectable by the sensor when the one or more spectacle lenses include a predetermined identification structure. Alternatively or in addition, the sensor may be configured so that the presence of a spectacle frame within a detection range of the sensor is detectable by the sensor when the spectacle frame includes a predetermined identification structure. The system may further include a control unit. The control unit may be configured to receive an information from the sensor. The control unit may be configured to carry out a predetermined action, upon a condition in which the one or more spectacle lenses and/or the spectacle frame is detected. The sensor is spaced apart from the spectacle.

According to various embodiments, the predetermined identification structure may be an identification reflection structure and/or an identification pattern structure. According to various embodiments, the predetermined identification may be selected from the group of: an optical filter, a two-dimensional pattern, a thin film coating. Examples of a two-dimensional pattern includes a patterned thin film coating, a micrograting, a nanograting, or a combination thereof. Examples of a thin film coating include a multiplayer organic film, a multiplayer inorganic film, or a combination thereof. The predetermined identification structure may be substantially non-visible, for example it may be detectable in the infra-red.

According to some embodiments, the predetermined action may be to change a power state of an electronic component, an electronic unit or of an electronic device, for example dim a display or toggle a switch. The switch may be selected from an electrical switch, an electronic switch, a power switch, but is not limited thereto.

According to various embodiments, the one or more spectacle lenses may include a first spectacle lens including the predetermined identification structure. In some embodiments, the one or more spectacle lenses is the first spectacle lens.

According to some embodiments, the one or more spectacle lenses may include a first spectacle lens and a second spectacle lens, for example, included in a spectacle. The first spectacle lens may include a first predetermined identification substructure. The second spectacle lens may include a second predetermined identification substructure. The predetermined identification structure may include, for example be formed of, the first predetermined identification substructure and the second predetermined identification substructure. In one example, it may be possible to detect the presence of the first and second lenses only when the first and second substructures are present.

According to various embodiments, the information from the sensor may include a distance representing distance from the one or more spectacle lenses or, from the spectacle frame, to the sensor. The control unit may further include a comparator logic to compare the distance with a threshold and thereby provide a comparison result. The carrying out of the predetermined action may be dependent on the comparison result.

According to various embodiments, the one or more spectacle lenses and/or the spectacle frame may be configured to provide an outgoing signal upon incidence of an incoming signal. The incoming signal may be modified by the predetermined identification structure, for example, into the outgoing signal. The sensor may be configured to receive the outgoing signal from the one or more spectacle lenses and/or the spectacle frame. The outgoing signal may be reflected signal, for example, a reflection of the incoming signal.

According to various embodiments, the system may further include an emitter configured to emit the incoming signal. For example, the incoming signal may be chopped and/or modulated.

According to various embodiments, the control unit may be configured to carry out a second predetermined action, when the condition becomes unsatisfied.

According to various embodiments, the sensor may be electronically connected to the control unit.

According to various embodiments, the system may further include a sensor unit including the sensor and a radio communication device. The radio communication device may be configured to establish communication with the control unit.

A second aspect of the disclosure concerns a method of operating the system according to various embodiments. The method may include detecting the presence of the spectacle within a detection range of the sensor due to the one or more spectacle lenses including the predetermined identification structure. The method may include providing, by the sensor, an information to the control unit. The information may confirm the detection of the spectacle. The method may include carrying out, by the control unit, a predetermined action. The detecting the presence of the spectacle may include detecting the presence of the one or more spectacle lenses and/or detecting the presence of the spectacle frame.

A third aspect of the disclosure concerns a computer program product including instructions to cause the system according to various embodiments to execute the steps of the method of operating the system according to various embodiments.

A fourth aspect of the disclosure concerns a computing device including a sensor and a memory. The computing device may be a multi-purpose mobile computing device. The sensor may be configured to detect a presence of a spectacle including a predetermined identification structure. The memory may have stored the computer program product of the third aspect. To detect the presence of the spectacle may include to detect the presence of the one or more spectacle lenses and/or detecting the presence of the spectacle frame.

BRIEF DESCRIPTION OF THE DRAWINGS

Embodiments of the invention will now be described, by way of example, and with reference to the following drawings in which.

Figure 1A:
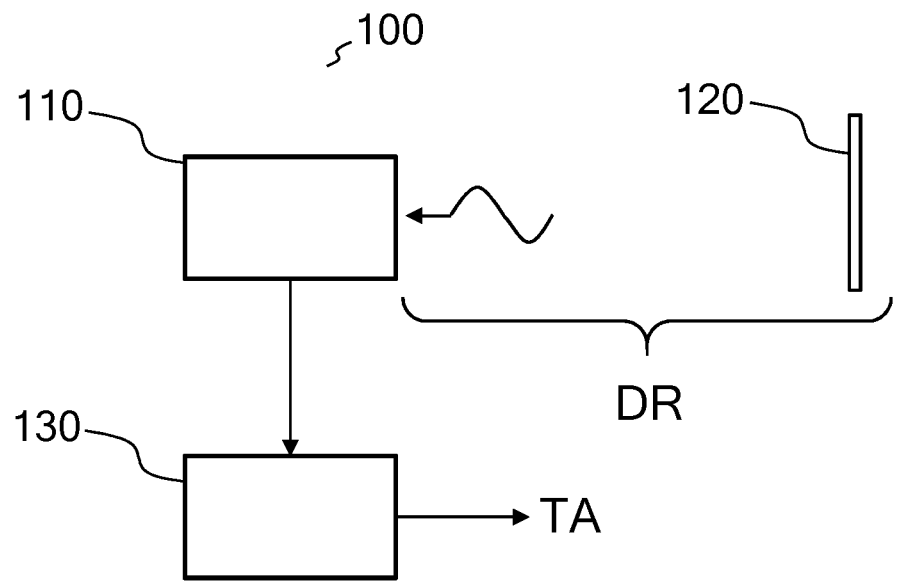
FIGS. 1A and 1B show a schematic illustration of systems 100, in accordance with various embodiments.

The figures are of schematic nature and elements therein may be of different scale or positioned differently to improve readability.

DETAILED DESCRIPTION

In the description, which follows, the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may be embodied in a wide variety of contexts. Embodiments discussed herein are merely representative and not limiting. Some figures may show embodiments with a single lens for illustrative purposes and the disclosure is not limited thereto, these embodiments may be adapted to one or more lenses as described herein.

Various embodiments disclosed herein relate to the various aspects of the disclosure such as a system, a method of operating the system, a computer program product, and a computing device. Embodiments and explanations thereof disclosed in connection with one embodiment may be applicable to other embodiments. For example, embodiments and explanations to the system may be applicable to the method and vice-versa.

Various embodiments disclosed herein are shown and explained wherein the predetermined identification structure is included in one or more spectacle lenses, these embodiments may also be altered, based on the teachings herein, so that the predetermined identification structure is included in the spectacle frame, as an alternative or in addition to being included in the one or more spectacle lenses. Thus, a detection of a spectacle may mean the detection of the one or more spectacle lenses. Alternatively or in addition, a detection of a spectacle may mean the detection of the spectacle frame.

The term "spectacle lens", as used herein, and in accordance with various embodiments, may refer to a lens for an eyewear, such as, e.g., spectacles and sun glasses, which lens may or may not have corrective power. The term "eyewear", according to various embodiments, may refer to an object to be worn on/in relation to the eye, for example spectacles. The term "spectacles" (in plural or singular), as used herein, and in accordance with various embodiments, may refer to glasses and may refer also to goggles.

The term "spectacle frame", as used herein, and in accordance with various embodiments, may refer to a frame of a spectacle. The spectacle frame is configured to support spectacle lenses for example between a bridge and lugs and sides, or in lens receptacles.

The predetermined identification structure, as described herein, and in accordance with various embodiments, may preferably not require any electric or electronic component, and may thus be electronic component free. The term "electronic component" and "electric component" may be used interchangeably, in the singular as well in the plural forms. For example, the predetermined identification structure the may refer to an optical element or arrangement of elements. Embodiments and examples of predetermined identification structures will be described in more details below. According to various embodiments, the one or more lenses and the spectacle frame may be electronic component free. According to various embodiments, a spectacle including the one or more lenses and/or the spectacle frame may be electronic component free. According to various embodiments, a spectacle including the one or more lenses and/or spectacle frame may be projector optics free, such as, e.g., reading glasses, ophthalmic glasses, sun glasses, or otherwise exemplified herein, with the proviso that the spectacle is not a head mounted device (HMD), the spectacle lenses are not lenses of an HMD device, and the spectacle frame is not a frame of an HMD device.

As used herein, the visible spectrum may be defined as light having wavelength in vacuum from 380 nm to 780 nm.

As used herein, the near infrared (NIR) spectrum may be defined as light having a wavelength in vacuum longer than 780 nm and shorter or equal to 1400 nm.

As used herein, the predetermined identification structure may be configured to be effectively invisible to the user (whether wearing the spectacle or facing the front face of the spectacle). In other words, a user of the one or more spectacle lenses and/or the spectacle frame would normally not be able to visually identify or notice the presence of the predetermined identification structure, e.g., when facing the front surface of the spectacle.

As used herein, the predetermined identification structure may be a coating, a film, and/or a layer which is disposed conformably on the surface of the one or more spectacle lenses and/or on the surface of the spectacle frame, therefore being substantially free of elevations, e.g., free of elevations that are thicker than the thickness of the coating, a film, and/or a layer. The predetermined identification structure may be a material which is integrated into or integral to the spectacle frame and may further be substantially flush with the neighboring surface of spectacle frame.

As used herein, the term "user" may refer to a user wearing the spectacle, for example wearing a spectacle including the one or more spectacle lenses and/or the spectacle frame.

As used herein, the term "and/or" includes any and all combinations of one or more of the associated listed items.

FIG. 1A shows a schematic illustration of a system 100, in accordance with some embodiments. The system 100 includes a sensor 110. The sensor 110 may be configured so that the presence of one or more spectacle lenses 120 within a detection range DR of the sensor 110 is detectable by the sensor 110 when the one or more spectacle lenses 120 include a predetermined identification structure. The system 100 may further include a control unit 130. The control unit 130 may be configured to receive an information from the sensor 110. The control unit 130 may be configured to carry out a predetermined action TA, upon a condition in which the one or more spectacle lenses 120 is detected.

Figure 1B:
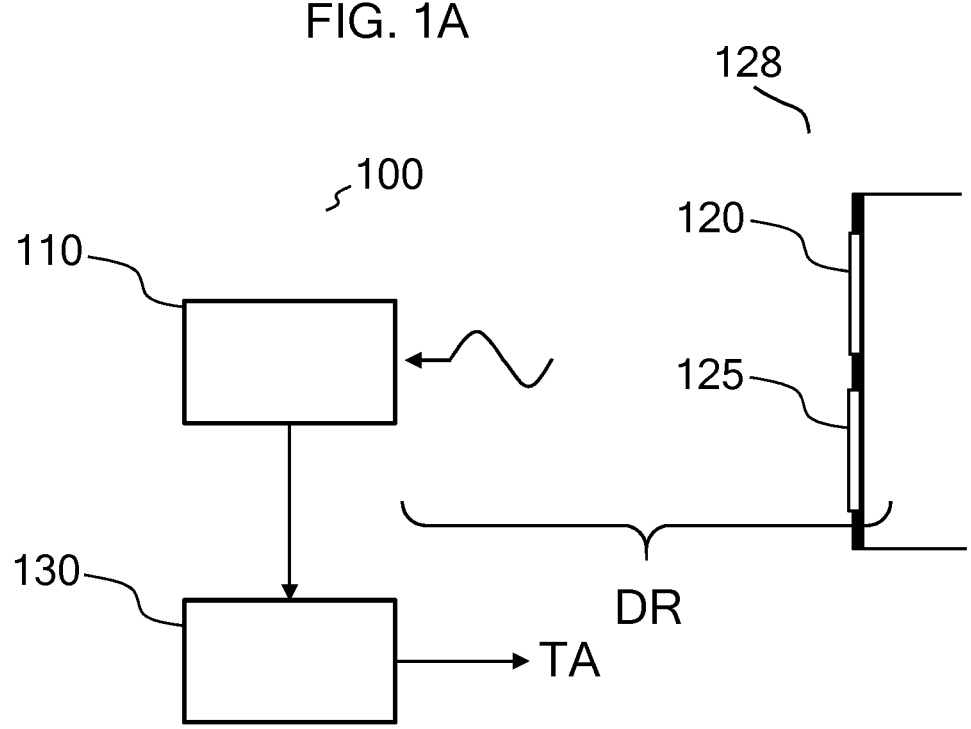

FIG. 1B shows a schematic illustration of a system 100, in accordance with some embodiments. The system 100 includes a sensor 110. The sensor 110 may be configured so that the presence of a spectacle 128 may be determined. For example, the sensor 110 may be configured so that the presence of more than one spectacle lens, such as a first spectacle lens 120 and a second spectacle lens 125, within a detection range DR of the sensor 110, is detectable by the sensor 110 when the spectacle lenses include a predetermined identification structure. The first spectacle lens may include a first predetermined identification substructure. The second spectacle lens may include a second predetermined identification substructure. The predetermined identification structure may include, for example be formed of, the first predetermined identification substructure and the second predetermined identification substructure. The system 100 may further include a control unit 130. The control unit 130 may be configured to receive an information from the sensor 110. The control unit 130 may be configured to carry out a predetermined action TA, upon a condition in which the one or more spectacle lenses 120 is detected, for example upon a condition in which the first spectacle lens and the second spectacle lens are detected. As shown, and in accordance with various embodiments, the sensor 110 is not included in the spectacle and is mechanically uncoupled, e.g., spaced apart, from the spectacle. As shown, and in accordance with various embodiments, the control unit 130 is not included in the spectacle and is mechanically uncoupled, e.g., spaced apart, from the spectacle. While several embodiments are shown and explained wherein the predetermined identification structure is included in one or more spectacle lenses, these embodiments may also be altered, based on the teachings herein, so that the predetermined identification structure is alternatively or additionally, included in the spectacle frame.

According to some embodiments, the sensor may be an optical sensor, such as a NIR sensor. The sensor may include a plurality of photodiodes, a photosensor (e.g. photodiode) 1-dimensional, 2-dimensional or 3-dimensional array, for example, for providing measurement at different angles, and/or different wavelengths. According to some embodiments, the sensor may be a combination of one or more sensors, for example of different type.

According to some embodiments, the sensor and the control unit may be integrated, or integral, in a single device, for example a smartphone. Alternatively, according to some embodiments, the sensor may and the control unit may be separated parts which may be mechanically coupleable together by a user, or which may not be mechanically coupleable together by a user.

According to some embodiments, carrying out a predetermined action may mean triggering the predetermined action, for example, if the condition becomes satisfied from a previous unsatisfied condition. In some embodiments, carrying out the predetermined action may mean continuously carrying out the predetermined action, for example, driving an LED or adjusting the light intensity of a display.

The predetermined action may be to change a power state of an electronic component, and electronic unit or of an electronic device, for example, dim a light or a display, toggle a switch. Examples of switches are: electrical switch, electronical switch, power switch. The term "dim" may mean adjust a light of display light intensity, for example by regulating down or regulating up. The electronic component may include a haptic feedback vibration motor. For example, the predetermined action may include a change of a mode of a device depending on a distance, for example, depending on three distance ranges or two distance thresholds of the distance from the one or more spectacle lenses to the sensor. For example the three distance ranges may be a first range proximal to the device, third range distal from the device, and a second range between the first and the third ranges. For example, a mode of a device (e.g. a mobile phone) may be set to normal mode (or "ringing", e.g., in the case of a mobile phone) for the first range, to silent mode or "vibration mode" for the second range, and to quiet mode for the third range. The quiet mode as used herein is also known as do not disturb mode. The mode of the device could also be set on a reverse correspondence as explained above, wherein the mode of a device such as a mobile phone, may be set to normal mode (or "ringing", e.g., in the case of a mobile phone) for the third range, to silent mode or "vibration mode" for the second range, and to quiet mode for the first range. For example, the user may not need to be called attention with ringing when he is close (within the first range) to the device, and may require the acoustic signal of ringing when the device needs to call the user and the user is far (within the third range) from the device.

Figure 2:
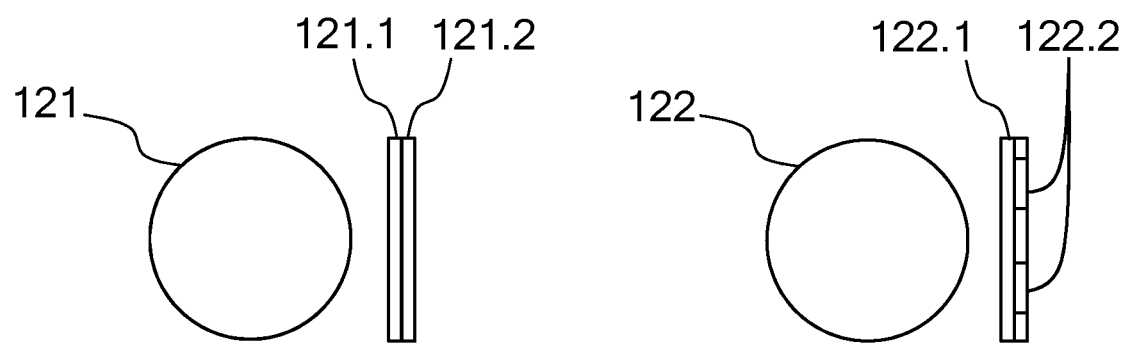
FIG. 2 shows schematic illustrations of spectacle lenses 121 and 122 in plan view and side-view, in accordance with various embodiments.

FIG. 2 shows schematic illustrations of one or more spectacle lenses 121 and 122 in plan view and side-view, in accordance with various embodiments. The one or more spectacle lenses 121 includes a first layer 121.1 and a predetermined identification structure 121.2 in the form of a second layer. In accordance with various embodiments, the predetermined identification structure may be selected from the group of: an optical filter, a two-dimensional pattern, a thin film coating, a multiplayer organic film, a hologram, a photonic crystal. As illustrated in FIG. 2 by way of example, the predetermined identification structure 121.2 may be disposed over a complete face (one of the two major opposing sides) of the first layer 121.1. For example, the predetermined identification structure 121.2 may be an optical filter, e.g., an optical mirror, configured to reflect light with a predetermined wavelength, which wavelength can be detected by the sensor 110 and be distinguished from conventional one or more spectacle lenses which do not include the predetermined identification structure. The optical mirror may be provided in the form of a thin film coating. The predetermined identification structure 121.2 may be configured to be effectively invisible to the user. In other words, a user of the one or more spectacle lenses 121 would normally not be able to visually identify or notice the presence of the predetermined identification structure 121.2. For example, in the case of an optical mirror, the mirror may be provided such that it is transparent in the visible light range, but has at least a high reflectance at a wavelength outside of the visible spectrum. The high reflectance in the first wavelength may be, e.g., greater than 60%, greater than 70% or greater than 80%.

According to various embodiments, the sensor and the predetermined identification structure may be configured so that the predetermined identification structure is detectable by the sensor, wherein the predetermined identification structure is encoded data free and the sensor is not necessarily configured to read encoded data. Therefore, the predetermined identification structure may be simple to manufacture and easy to conceal for aesthetic reasons. Examples of encoded data are text, linear bar codes, QR codes.

According to various embodiments, the predetermined identification structure is free of text, free of data encoded according to one dimensional data encoding standards such as one-dimensional bar codes, and free of data encoded according to two dimensional data encoding standards such as two-dimensional bar codes, e.g., QR code. According to various embodiments, even if a spectacle may include text and or another encoded data, these do not affect and are not necessary for the functions of the predetermined identification structure as described herein.

The one or more spectacle lenses 122 may include a predetermined identification structure 122.2 which is patterned, and thus not completely or inhomogeneously covering a face of the one or more spectacle lenses 122. The predetermined identification structure may be identified by different properties, for example, by its reflectance (as in one or more spectacle lenses 121) and/or by its pattern. According to various embodiments, the one or more predetermined identification structure 122.2 may be configured to be of reduced visibility to the user, for example by being reflective and/or absorptive in the NIR spectrum more than in the visible spectrum, the predetermined identification structure may be effectively invisible to the user.

The system in accordance with various embodiments may include the one or more spectacle lenses and/or the spectacle frame including the predetermined identification structure.

According to some embodiments, the predetermined identification structure may be provided on at least one part of the one or more spectacle lenses, for example the predetermined identification structure may fully cover at least one of the two main surfaces of the one or more spectacle lenses. Alternatively, the predetermined identification structure may partially cover at least one of the two main surfaces of the one or more spectacle lenses and keep the remaining surface of the at least one of the two main surface uncovered by the predetermined identification structure.

According to some embodiments, the predetermined identification structure may be provided on a spectacle frame, for example on at least a portion of a front facing surface of the spectacle frame, e.g., the front facing surface of one or more of the lens receptacles for the first spectacle lens 120 and the second spectacle lens 125. At least one part of the one or more spectacle lenses, for example the predetermined identification structure may fully cover at least one of the two main surfaces of the one or more spectacle lenses. In accordance with various embodiments, the predetermined identification structure may be selected from the group of: an optical filter, a two-dimensional pattern, a thin film coating, a multi-layer organic film, a hologram, a photonic crystal. A first portion of the spectacle frame, such as the front facing surface of the lens receptacle for the first spectacle lens 120 may include a first predetermined identification substructure. A second portion of the spectacle frame, such as the front facing surface of the lens receptacle for the second spectacle lens 120 may include a second predetermined identification substructure. Alternatively or in addition, the first and/or the second identification structures may be included in the bridge between two lenses. The predetermined identification structure may include, for example be formed of, the first predetermined identification substructure and the second predetermined identification substructure.

In some embodiments, the predetermined identification structure may be an identification reflection structure, such as an optical filter. The optical filter may have significantly different reflectance and/or transmission properties at two different wavelengths. The optical filter may have a high reflectance in a first wavelength, for example in the NIR spectrum, for example 940 nm, and a low reflectance in a second wavelength lower than the first wavelength, for example the second wavelength may be in the visible spectrum, for example selected from 450 nm to less than 780 nm, or from 450 nm to 700 nm, such as 600 nm. The high reflectance in the first wavelength may be, e.g., greater than 60%, greater than 70% or greater than 80%. The low reflectance in the second wavelength may be lower than the high reflectance, e.g., lower than 5%, or lower than 2%. The first wavelength and the second wavelength may be separated by a wavelength range, for example between 500 and 100 nm, for example by less than 100 nm, or less than 50 nm.

According to some embodiments, the identification structure may be an interferential coating. According to some embodiments, the interferential coating may be a quarter wavelength stack. In one example, the quarter wavelength stack may be optimized for 940 nm. The interferential coating may include a stack of alternated low refractive index layers and high refractive index layers, starting e.g., with a high refractive index layer, on a substrate. The optical thickness of each of the low refractive index layers and the high refractive index layers may be about 0.25 wavelengths. In one example, the low refractive index layers may be of $SiO_2$ and the high refractive index layers may be of SiN, and the physical thickness of each of the low refractive index layers may be about 162 nm, and the physical thickness of each of the high refractive index layers may be about 122 nm. The interferential coating may further include an outer low refractive index layer, for example of $SiO_2$ with optical thickness of 0.125 and physical thickness of 81 nm. According to measured reflectance as function of the wavelength the reflection peak in the NIR increases with the increasing number of layers. A stack of 10 or more layers may provide a peak reflectance measured at a substantially normal to the respective lens or the spectacle frame of at least 70%. The expression "substantially normal", as used herein and according to various embodiments, may mean within an angle of 15 degrees from the geometric normal to a surface of the lens or the spectacle frame including the coating or filter.

According to some embodiments, the interferential coating may include low refractive index layers, e.g. of $SiO_2$ and high refractive index layers, e.g., of $TiO_2$, alternately stacked on the substrate. In one example, the thicknesses of the layers is optimized for 850 nm, for example the layers may be, starting from the substrate, as follows $TiO_2$ —102.1 nm, $SiO_2$ — 140.2 nm, $TiO_2$ — 89.1 nm, $SiO_2$ — 141.1 nm, $TiO_2$ — 85 nm, $SiO_2$ 69.4 nm. The reflectance spectrum of the exemplary interferential coating has a peak reflectance measured at a substantially normal to the optical article greater than 70% in the NIR spectrum and the reflectance is close to 0% (less than 5%) at a substantial portion of the visible spectrum.

With the knowledge of the present disclosure the skilled person in the art may obtain other layer configurations, for example with other materials, using available calculation tools, e.g. with the transfer matrix method, without needing to resort to undue experimentation.

In some embodiments, the predetermined identification structure may be a two-dimensional pattern, for example a geometric pattern. In one example, the predetermined identification structure may be a logo with NIR properties, for example, detectable in the NIR spectrum but substantially not detectable in the visible spectrum. Examples of a two-dimensional pattern includes a micrograting, a nanograting, or a combination thereof. In other examples, the pattern may be provided by a patterned optical filter, or a patterned interferential coating. For example, the interferential coating may be provided on the one or more spectacle lenses and/or the spectacle frame in the form of a plurality stripes. Such pattern may be detected, for example, by a sensor including a NIR photo sensors array, for example a NIR CMOS camera or a NIR CCD camera.

According to some embodiments, the presence of one or more spectacle lens within a detection range of the sensor is detectable by detecting a certain reflection intensity, a reflection intensity ratio between two different wavelengths, an outgoing signal intensity, an outgoing signal intensity to reference ratio between two different wavelengths, an outgoing signal intensity to reference ratio, wherein the reference may be for example, background signal (e.g. ambient light) or emission signal, or a combination thereof.

Figure 3:
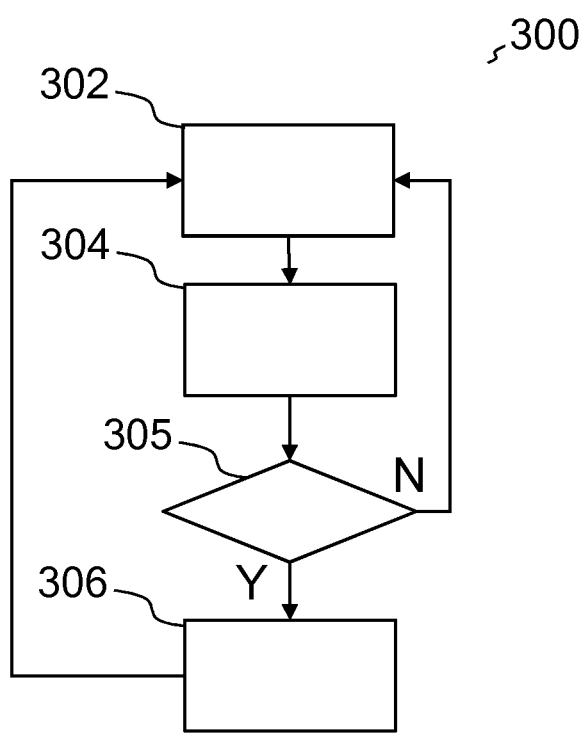
FIG. 3 shows a flowchart showing a method 300 of operating the system 100, in accordance with various embodiments.

FIG. 3 shows a flowchart showing a method 300 of operating the system 100, in accordance with various embodiments. The method 300 may include a step 302 of detecting the presence of the spectacle (a single lens 120 is shown for illustration purposes, but the disclosure is not limited thereto) within a detection range DR of the sensor 110 due to the one or more spectacle lenses and/or the spectacle frame including the predetermined identification structure. The method 300 may include a step 304 of providing, by the sensor 110, an information to the control unit 130. The information may confirm the detection of the one or more spectacle lenses. The method 300 may include a step 306 of carrying out, by the control unit 130, a predetermined action TA. In the example illustrated in FIG. 3, the method 300 includes a decision block 305, however the disclosure is not limited thereto. In decision block 305, it may be decided if the condition (for example, in which the one or more spectacle lenses and/or the spectacle frame may be detected) is satisfied ("Y"), then the method 300 proceeds to step 306. If the condition is unsatisfied ("N"), the method 300 proceeds back to step 302. After the step 306 is concluded, the method 300 may proceed back to step 302 and repeat the method steps. Other method steps may be included in method 300, for example, one or more of: load initialization data; load user profile; establishing a communication connection between the sensor and the control unit; determine a threshold distance; calibrate the sensor. Various embodiments concern a computer program product including instructions to cause the system according to various embodiments to execute the steps of the method of operating the system. The computer program may be stored in a physical media, for example in a flash memory, a CD-ROM, a hard disc drive, in RAM, or in a cloud. The computer program product may include instructions compatible to be carried out by a microprocessor or a microcontroller. For example, the computer program product may be an application ("app") for a mobile phone.

According to various embodiments, at least one of, for example all of: the threshold distance or distances, the plurality of input parameters, the predetermined action are configurable, for example by a user via a user interface.

Various embodiments also concern a computing device including a sensor and a memory. The computing device may be a multi-purpose mobile computing device. Examples for multi-purpose mobile computing device are: mobile phone, tablet, smartwatch, handheld device, laptop, electronic wearable device. The computing device may include a microprocessor and/or a microcontroller. The computing device may be configured to store measured information, or processed measured information, which may be retrieved for further use at a later time. The sensor may be integrated into the computing device, and may be configured to detect a presence of one or more spectacle lenses and/or spectacle frame including a predetermined identification structure. The device may include the computer program stored in it, for example, in the device's memory.

According to various embodiments, the information from the sensor 120 may include a distance representing distance from the one or more spectacle lenses or the spectacle frame to the sensor 110.

According to various embodiments, the control unit 130 may further include a comparator logic to compare the distance with a threshold and thereby provide a comparison result. For example, the comparison may be carried out in the decision block 305 illustrated in FIG. 3. The carrying out of the predetermined action TA may be dependent on the comparison result. In other words, the condition in which the spectacle is detected is dependent on the comparison result, for example when the comparison result reflects that the distance is smaller than the threshold, then the condition is satisfied, otherwise the condition is unsatisfied.

In some embodiments, a plurality of input parameters may be used together with the condition as input in a decision logic (for example an algorithm) to decide whether a pre-determined action should be carried out, for example, the plurality of input parameters may include a plurality of additional conditions which all have to be satisfied (for example via a logical 'AND' operator) in order carry out the predetermined action. In one example, when the condition is satisfied, for example, when there is a confirmation of the detection of the spectacle, the condition may be combined with the measurement of environment light and the orientation of the electronic device (for example the orientation of given by a gyro provided in the electronic device). If the spectacle is detected and the measurement of environment light indicates that it is dark and the orientation of the electronic device indicates that the device is not facing down, then the electronic device may determine that there is a high likelihood of the device being in a cinema and may carry out the appropriate tasks, such as activating a vibration mode or a silent mode.

According to various embodiments, the control unit may be configured to carry out a second predetermined action, when the condition becomes unsatisfied.

According to various embodiments, the control unit may be an electronic control unit. For example, the electronic control unit may include at least one of: a microprocessor, a microcontroller, a memory, an interface circuit.

According to various embodiments, carrying out the second predetermined action may mean triggering the second predetermined action, for example, if the condition becomes unsatisfied from a previous satisfied condition.

In some embodiments, carrying out the second predetermined action may mean continuously carrying out the second predetermined action.

Figure 4:
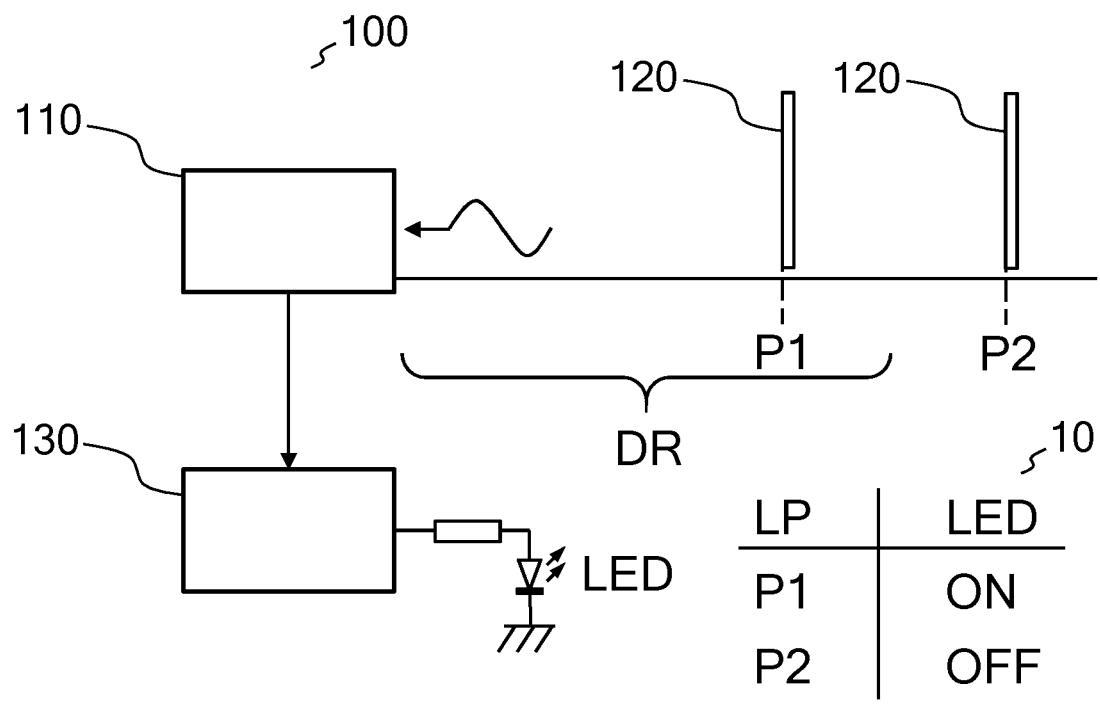
FIG. 4 shows a schematic illustration of a system 100, and the effect on a predetermined action for two different positions P1 and P2 of the spectacle lens 120, in accordance with some embodiments.

FIG. 4 shows a schematic illustration of a system 100, and the effect on a predetermined action TA for two different positions P1 and P2 of the spectacle, e.g., one or more spectacle lenses (only one lens 120 is shown for illustration purposes, but the disclosure is not limited thereto), in accordance with some embodiments. The system 100 may include an LED electronically connected to the control unit 130, which in this case may be an electronic control unit 130. The LED is used for illustration purposes, but the disclosure is not limited thereto. When the one or more spectacle lenses 120 is at a position LP=P1, and within the detection range DR of the sensor 110 (P1≤DR), the sensor 110 detects the presence of the one or more spectacle lenses 120. The control unit 130 receives the information about the detection from the sensor 110 and carries out the predetermined action TA, which in this exemplary case is to turn on the LED. When the one or more spectacle lenses 120 are moved to a position LP=P2 (P1>DR), the sensor does not detect the presence of the one or more spectacle lenses 120. In that case the condition becomes unsatisfied, and the control unit 130 may be configured to carry out the second predetermined action TA, such as, e.g., turning the LED off, as shown in the table 10 in FIG. 2. While above example is explained using the one or more spectacle lenses, the disclosure is not limited thereto, and the detection may be, alternatively or in addition, the detection of the spectacle frame.

Alternatively or in addition, instead of a binary condition reflecting whether the spectacle is detected or not, the sensor 110 may be configured to transmit information including a distance to the control unit 130. The distance represents distance from the one or more spectacle lenses 120 or the spectacle frame to the sensor 110. The control unit 130 may carry out a control based on the distance included in the information received from the sensor 110. In some embodiments, a plurality of input parameters may be used together with the condition as input in a decision logic (for example an algorithm) to decide whether a pre-determined action should be carried out, for example, the plurality of input parameters may include a plurality of additional conditions. The control may be gradually proportional to the distance. For example, the control unit 130 may control the intensity of the LED as a function of the distance. In another example, the control unit 130 could dim a display, e.g., to display intensities inversely proportional to the distance. Alternatively, the control may be binary, for example, the distance may be compared to a threshold, wherein the threshold is a predetermined distance. The control unit 130 may further include a comparator logic to compare the distance with a threshold and thereby provide a comparison result. The carrying out of the predetermined action TA may be dependent on the comparison result. For example, the control unit 130 may be configured to carry out the predetermined action TA if the distance is smaller than the threshold.

In one example, the predetermined action TA is to adjust a font size of a text shown on the display, according to the distance between the sensor and the spectacle. For example, as the distance gets smaller, the font size may increase, thereby facilitating reading of the text by a user without requiring the user to get too close to the display. In another example, as the distance gets smaller, the font size may decrease, thereby providing an incentive to the user to increase the distance to improve readability.

In another example, the predetermined action TA is to send a nudge through the control unit to the user if the distance between the sensor and the spectacle is smaller than the threshold. An example of the nudge is shaking at least a portion of the display, such as a window shown on the display. Another example is playing a sound. Such a nudge may be implemented to alert the user of bad posture and/or bad reading distance.

In a further example, the predetermined action TA is to start counting a time once the distance between the sensor and the spectacle is smaller than the threshold.

In yet a further example, data about reading distance could be stored over time to provide historical data. The historical data could be analyzed for trends, for example, trends of reading distance over time which may infer in worsening of user's visual problems.

Figure 5:
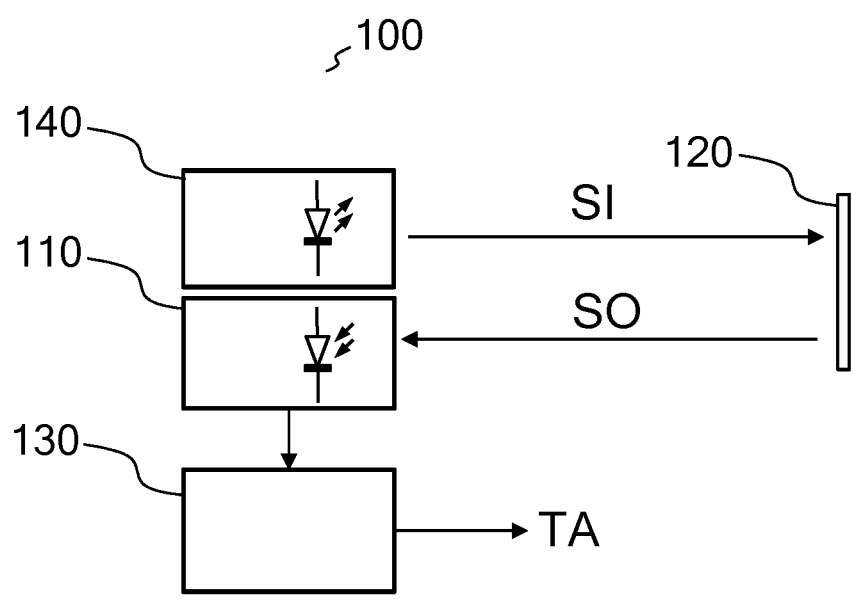
FIG. 5 shows a schematic illustration of a system 100 further including an emitter 140, in accordance with various embodiments.

FIG. 5 shows a schematic illustration of a system 100 further including an emitter 140, in accordance with some embodiments. As with some other embodiments, this embodiment is explained by using the one or more spectacle lenses, however the disclosure is not limited thereto, and, alternatively or in addition, the spectacle frame could be used. The emitter may be configured to emit an incoming signal SI, and the one or more spectacle lenses may be configured to emit an outgoing signal SO upon incidence of the incoming signal SI, which incoming signal SI is modified into the outgoing signal SO by the predetermined identification structure. In the case that no emitter 140 is present in the system, the incoming signal may be, for example, ambient light or from another emitter external to the system. With the inclusion of an emitter in the system 100 it is possible to further control characteristics of the incoming signal SI, for example to chop and/or modulate the signal. Further, it is possible to use the characteristics of the incoming signal to distinguish the outgoing signal from noise, for example, by synchronizing the chopping and/or modulating frequency and/or phase between the emitter 140 and the sensor 110. In an example, the emitter 140 may emit light with a first wavelength (e.g. in the NIR spectrum), and the sensor 110 may include an optical filter to allow reflection of light with the first wavelength and to transmit or absorb light of other wavelengths (e.g. in the visible spectrum). The inclusion of an emitter may improve the signal strength, in particular a stronger outgoing (for example reflected) signal may be obtained with an emitter, for example, compared to ambient light. Alternatively or in addition to the signal strength, the signal to noise ratio may also be improved with the inclusion of an emitter.

According to various embodiments, when the system further includes an emitter, the emitter and the sensor may interact to emit and receive a same type of signal, which may be tuned to the identification structure, for example the emitter and the sensor may form a NIR distance sensor.

According to various embodiments, the emitter is separated from the one or more lenses, from the spectacle frame, and from a spectacle including the one or more of the foregoing. Therefore, the emitter is not mechanically coupled to the one or more lenses and is not mechanically coupled to the spectacle.

Figure 6:
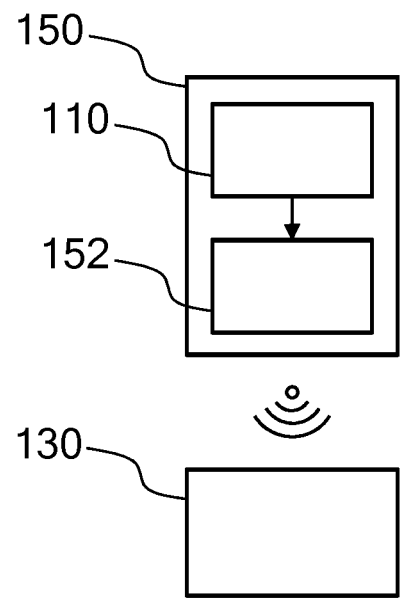
FIG. 6 shows a schematic illustration of a system 100 including a sensor unit 150 including the sensor 110 and a radio communication device 152, wherein the radio communication device 152 is configured to establish communication with the control unit 130.

FIG. 6 shows a schematic illustration of a system 100 including a sensor unit 150 including the sensor 110 and a radio communication device 152, wherein the radio communication device 152 is configured to establish communication with the control unit 130. The radio communication device 152 and the control unit 130 may be configured to communicate with radio frequency signals, for example, Wireless LAN (for example, within the industrial, scientific and medical (ISM) radio bands of 2.4 GHz or 5 GHz, such as, e.g., based on the IEEE 802.11 standards) or Bluetooth (for example, using channels with frequency from 2.4 to 2.83 GHz in the ISM band). The communication may be at least from the radio communication device 152 (sender) to the control unit 130 (receiver), or may be bi-directional.

Figure 7:
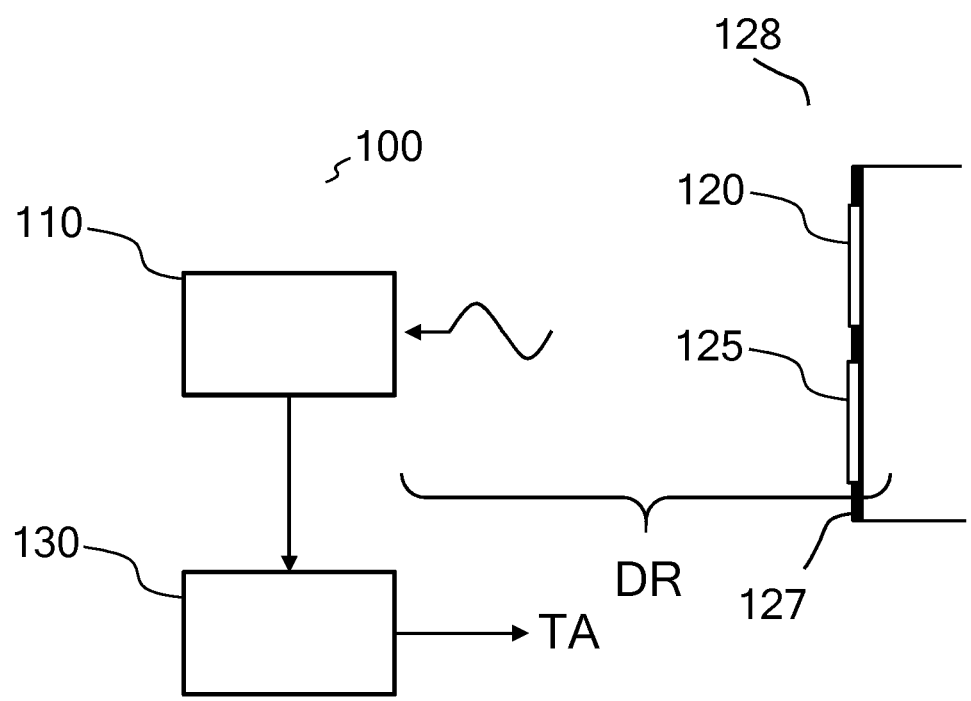
FIG. 7 show a schematic illustration of a system 100, in accordance with various embodiments.

FIG. 7 shows a schematic illustration of a system 100, in accordance with some embodiments. The system 100 includes a sensor 110. The sensor 110 may be configured so that the presence of a spectacle 128 may be determined. The sensor 110 may be configured to detect the presence of a spectacle frame 127, such as a front facing surface of the spectacle frame, e.g., the front facing surface of one or more of the lens receptacles for the first spectacle lens 120 and the second spectacle lens 125, within a detection range DR of the sensor 110. The spectacle frame 128 is detectable by the sensor 110 when the spectacle frames includes a predetermined identification structure. In accordance with various embodiments, the predetermined identification structure may be selected from the group of: an optical filter, a two-dimensional pattern, a thin film coating, a multiplayer organic film, a hologram, a photonic crystal. A first portion of the spectacle frame, such as the front facing surface of the lens receptacle for the first spectacle lens 120 may include a first predetermined identification substructure. A second portion of the spectacle frame, such as the front facing surface of the lens receptacle for the second spectacle lens 120 may include a second predetermined identification substructure. Alternatively or in addition, the first and/or the second identification structures may be included in the bridge between two lenses. The predetermined identification structure may include, for example be formed of, the first predetermined identification substructure and the second predetermined identification substructure. The system 100 may further include a control unit 130. The control unit 130 may be configured to receive an information from the sensor 110. The control unit 130 may be configured to carry out a predetermined action TA, upon a condition in which the spectacle frame 127 is detected.

According to various embodiments, a predetermined identification structure that can reflect NIR according to the sensor's wavelength range (e.g. a digital device built-in sensor's wavelength range) may be integrated with the frame. According to various embodiments, the integrated frame is passive (not electronically powered), and could, e.g, trigger screen control action on the digital device within the detection range. For example, the detection range's upper limit could be set to values greater than 30 cm. This may be achieved by an app in the digital device which allows one to set the desired detection range's upper limit by which the predetermined action will be triggered, for example, the action could be to turn off the screen when within the range and could include turning on the screen when outside the range. In an example, the detection range's upper limit could be a minimum reading distance.

The predefined identification structure is substantially unnoticeable as compared to the frame. As such, it does not affect the aesthetic of the frame. In some embodiments, the predefined identification structure could include, or be, any material that is capable of reflecting NIR. In some embodiments, the predefined identification structure could be integrated with the frame using several methods, such as coating and lamination.

In some embodiments, the predefined identification structure is a reflective film which reflects in the operating wavelength of the proximity sensor and is substantially transparent or has substantially equal surface optical properties in the visible range as the neighboring surface of the spectacle frame.

Figure 8:
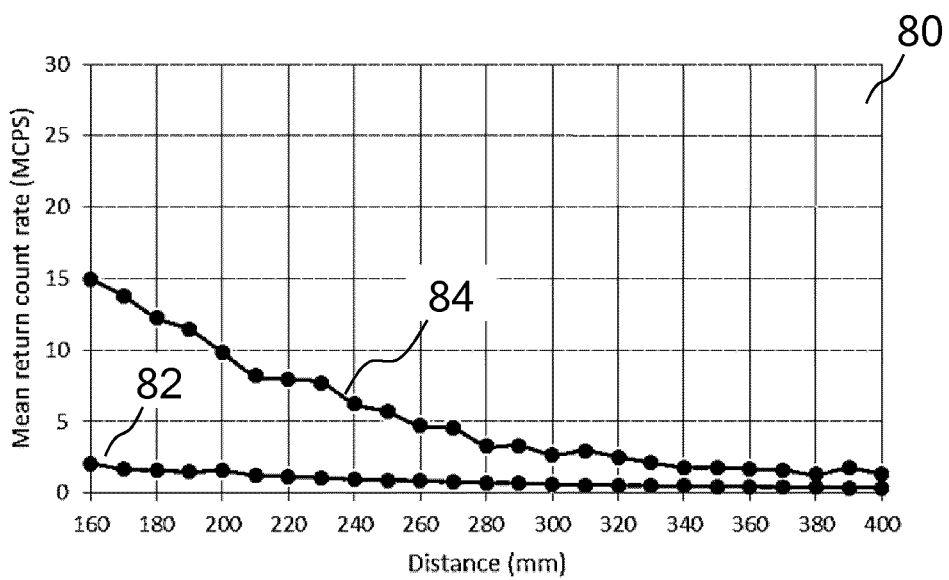
FIG. 8 shows a graph 80 comparing the reflection level between 2 test frames at various distances.

FIG. 8 shows a graph 80 comparing the reflection level between 2 test frames at various distances. In this embodiment, a reflective film, is taped to a spectacle frame and its performance is compared with the (unmodified) frame alone.

The graph compares the reflection level between the 2 test frames at various distances from 160 mm to 400 mm. Clearly, the frame with the predetermined identification structure (see plot 84) gives significantly higher reflection count (2 to 15 MCPS) than the unmodified (see plot 82) frame (0.5 to 2 MCPS).

In some embodiments, the predefined identification structure is an Anti-Reflective (AR) coating or a film coated with an Anti-Reflective (AR) coating. The AR coating reflects in the operating wavelength of the proximity sensor and is substantially transparent or has substantially equal surface optical properties in the visible range as the neighboring surface of the spectacle frame. The film may include a substrate, for example a plastic substrate onto which the AR coating is disposed.

Figure 9:
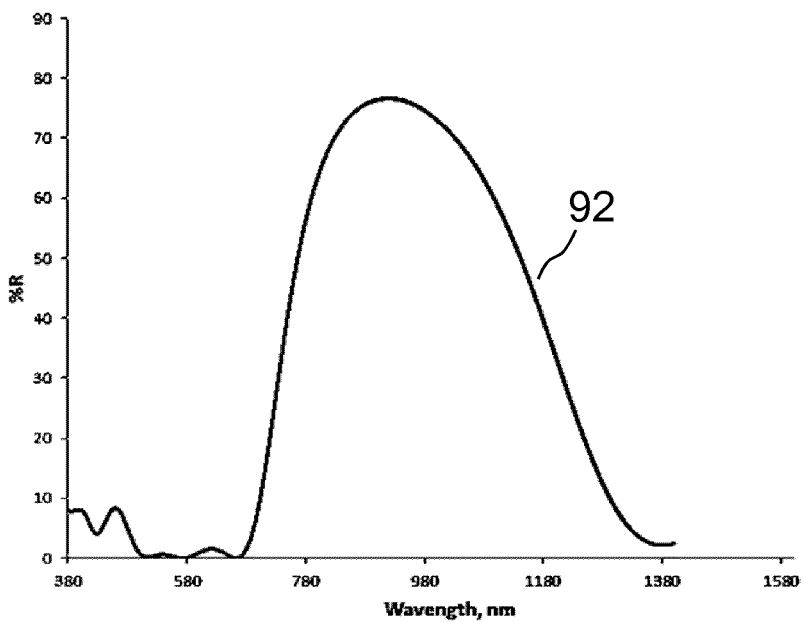
FIG. 9 shows the reflectance spectrum of an exemplary coating.

FIG. 9 shows the reflectance spectrum of an exemplary AR coating which reflects in the working wavelength region of the distance sensor. One exemplary spectrum of such AR coating is shown in FIG. 9 (see plot 92).

According to various embodiments, an AR coating may also be deposited onto the spectacle frames without requiring the film or a film's substrate. Alternatively, the AR coating may also be deposited on a plastic film (e.g. a plastic substrate) before trimming & attaching to a spectacle frame, the spectacle frame may be of various design.

In all above embodiments and examples, the one or more spectacle lenses and/or the spectacle frame is detectable by a sensor due to the one or more spectacle lenses and/or the spectacle frame including the predetermined identification structure. In other words, the system and the sensor are configured to detect the presence of one or more spectacle lenses and/or a spectacle frame including the predetermined identification structure. The predetermined identification structure may provide a kind of fingerprint for a respective spectacle type or spectacle unit. Conventional one or more spectacle lenses do not have a predetermined identification structure. Conventional spectacle frames are also devoid of a predetermined identification structure. Therefore, when a conventional one or more spectacle lenses and/or a conventional spectacle frame is placed within the detection range of the sensor, the sensor does not detect its presence or at least does not provide the information reflecting that one or more spectacle lenses or the conventional spectacle frame including a predetermined identification structure is detected. It follows, that, in the non-detection case, the predetermined action is not carried out by the control unit.

According to various embodiments, due to the proviso of the predetermined identification structure, the detection range is relatively long (e.g., in relation to detection of opaque objects by common distance sensors) because the predetermined identification structure allows for improved detection over background noise.

The invention claimed is:

1. A system comprising a sensor and a control unit,
   wherein the sensor is configured so that a presence of a spectacle within a detection range of the sensor is detectable by the sensor when the spectacle comprises a predetermined identification structure,
   wherein the control unit is configured to receive an information from the sensor and to carry out a predetermined action, upon a condition in which the spectacle is detected,
   wherein the presence of the spectacle is detectable by detecting a presence of one or more spectacle lenses,
   wherein the sensor is configured so that the presence of the one or more spectacle lenses within the detection range of the sensor is detectable by the sensor when the one or more spectacle lenses comprise the predetermined identification structure, and
   wherein the predetermined identification structure is selected from the group of: an optical filter, a two-dimensional pattern, and a thin film coating.

2. The system of claim 1, wherein the presence of the spectacle is detectable by detecting a presence of a spectacle frame, wherein the sensor is configured so that the presence of the spectacle frame within the detection range of the sensor is detectable by the sensor when the spectacle frame comprises the predetermined identification structure.

3. The system of claim 2, wherein the information from the sensor comprises a distance representing distance from the spectacle to the sensor,
   wherein the control unit further comprises a comparator logic to compare the distance with a threshold and thereby provide a comparison result, and
   wherein the carrying out of the predetermined action is dependent on the comparison result.

4. The system of claim 1, wherein the one or more spectacle lenses comprise a first spectacle lens comprising the predetermined identification structure.

5. The system of claim 1, wherein the one or more spectacle lenses comprise a first spectacle lens and a second spectacle lens,
   wherein the first spectacle lens comprises a first predetermined identification substructure and the second spectacle lens comprises a second predetermined identification substructure, and
   wherein the predetermined identification structure comprises the first predetermined identification substructure and the second predetermined identification substructure.

6. The system of claim 1, wherein the information from the sensor comprises a distance representing distance from the spectacle to the sensor,
   wherein the control unit further comprises a comparator logic to compare the distance with a threshold and thereby provide a comparison result, and
   wherein the carrying out of the predetermined action is dependent on the comparison result.

7. The system of claim 1, wherein the spectacle is configured to provide an outgoing signal upon incidence of an incoming signal, which incoming signal is modified by the predetermined identification structure, and wherein the sensor is configured to receive the outgoing signal from the spectacle.

8. The system of claim 7, further comprising an emitter configured to emit the incoming signal.

9. The system of claim 1, wherein the control unit is configured to carry out a second predetermined action, when the condition becomes unsatisfied.

10. The system of claim 1, wherein the spectacle is electronic component free.

11. The system of claim 1, further comprising a sensor unit comprising the sensor and a radio communication device, wherein the radio communication device is configured to establish communication with the control unit.

12. A method of operating the system of claim 1, comprising:
    detecting the presence of the spectacle within the detection range of the sensor due to the spectacle comprising the predetermined identification structure;
    providing, by the sensor, the information to the control unit, wherein the information confirms the detection of the spectacle; and
    carrying out, by the control unit, the predetermined action.

13. A non-transitory computer-readable medium on which are stored instructions that, when executed by a computer in a system comprising:
    a sensor; and
    a control unit;
    wherein the sensor is configured so that a presence of a spectacle within a detection range of the sensor is detectable by the sensor when the spectacle comprises a predetermined identification structure, and
    wherein the control unit is configured to receive an information from the sensor and to carry out a predetermined action, upon a condition in which the spectacle is detected,
    to carry out the steps of:
       detecting the presence of the spectacle within the detection range of the sensor due to the spectacle comprising the predetermined identification structure;
       providing, by the sensor, an information to the control unit, wherein the information confirms the detection of the spectacle; and
       carrying out, by the control unit, a predetermined action,
    wherein the presence of the spectacle is detectable by detecting a presence of one or more spectacle lenses,
    wherein the sensor is configured so that the presence of the one or more spectacle lenses within the detection range of the sensor is detectable by the sensor when the one or more spectacle lenses comprise the predetermined identification structure, and
    wherein the predetermined identification structure is selected from the group of: an optical filter, a two-dimensional pattern, and a thin film coating.

14. A computing device comprising the sensor configured to detect the presence of the spectacle comprising the predetermined identification structure, and a computer-readable memory having stored therein the instructions of claim 13.

* * * * *